(12) United States Patent
Veggian et al.

(10) Patent No.: US 10,530,266 B2
(45) Date of Patent: Jan. 7, 2020

(54) APPARATUS AND METHOD FOR TRANSFORMING ALTERNATING ELECTRICAL ENERGY

(71) Applicants: Massimo Veggian, Seveso (IT); Lorenzo Riva, Cavallasca (IT)

(72) Inventors: Massimo Veggian, Seveso (IT); Lorenzo Riva, Cavallasca (IT)

( * ) Notice: Subject to any disclaimer, the term of this patent is extended or adjusted under 35 U.S.C. 154(b) by 29 days.

(21) Appl. No.: 15/401,934

(22) Filed: Jan. 9, 2017

(65) Prior Publication Data
US 2017/0201185 A1    Jul. 13, 2017

(30) Foreign Application Priority Data
Jan. 7, 2016    (IT) .................. 102016000000852

(51) Int. Cl.
*H02M 5/10*    (2006.01)
*H01F 1/053*    (2006.01)
*H01F 38/30*    (2006.01)

(52) U.S. Cl.
CPC ............. *H02M 5/10* (2013.01); *H01F 1/053* (2013.01); *H01F 38/30* (2013.01); *H01F 2038/305* (2013.01)

(58) Field of Classification Search
CPC ....................................... H20M 5/10
USPC ........................................... 307/151
See application file for complete search history.

(56) References Cited

U.S. PATENT DOCUMENTS

| 5,023,768 A * | 6/1991 | Collier ............... H01F 30/16 336/175 |
| 5,444,608 A * | 8/1995 | Jain ................. H02M 3/337 363/132 |
| 5,563,778 A * | 10/1996 | Oh ................... H01F 29/00 307/48 |
| 5,815,059 A * | 9/1998 | Dailey ............... H01F 27/06 336/100 |
| 6,307,757 B1 * | 10/2001 | Porter ............... E02D 7/26 363/21.01 |
| 6,362,718 B1 * | 3/2002 | Patrick ............... H01F 29/14 336/214 |

(Continued)

*Primary Examiner* — Adi Amrany
(74) *Attorney, Agent, or Firm* — Sughrue Mion, PLLC

(57) ABSTRACT

An apparatus for transforming alternating electrical energy supplied by alternating electrical energy supply means to appliances using alternating electrical energy through electrical transformation means operatively interposed between and electromagnetically coupled to said alternating electrical energy supply means and to said appliances using alternating electrical energy, said electrical transformer means being of the two-stage type and comprising a first electrical transformer assembly and a second electrical transformer assembly, at least one permanent magnet being associated with said first electrical transformer assembly and positioned with respect to said first electrical transformer assembly in such a way that, when said alternating electrical energy supply means are switched on, the permanent magnetic field produced by said at least one permanent magnet is added to and amplifies the alternating electromagnetic field produced by said electrical transformer means, thereby amplifying the electrical energy transferred to said second transformer assembly and therefore to said appliances using alternating electrical energy.

12 Claims, 5 Drawing Sheets

(56) References Cited

U.S. PATENT DOCUMENTS

| | | | | |
|---|---|---|---|---|
| 6,377,153 B1* | 4/2002 | Yamanaka | ............ | H01F 27/362 336/182 |
| 6,717,504 B2* | 4/2004 | Fujiwara | ................. | H01F 3/10 336/178 |
| 6,885,272 B1* | 4/2005 | Piaskowski | ........... | H01F 29/146 336/110 |
| 7,242,147 B2* | 7/2007 | Jin | .......................... | H01F 38/00 315/177 |
| 7,446,485 B2* | 11/2008 | Huang | ................ | H05B 41/282 315/277 |
| 8,030,852 B2* | 10/2011 | Liao | ..................... | H05B 41/282 315/224 |
| 8,059,428 B2* | 11/2011 | Laitinen | ............... | H01F 7/0205 323/206 |
| 8,416,045 B2* | 4/2013 | Henning, III | .......... | H01F 27/38 336/110 |
| 8,466,770 B2* | 6/2013 | Richardson | ............. | H01F 38/00 336/229 |
| 9,030,119 B2* | 5/2015 | Jin | ..................... | H05B 33/0827 315/185 R |
| 2004/0085176 A1* | 5/2004 | Werlau | ..................... | H03H 7/42 336/229 |
| 2004/0196129 A1* | 10/2004 | Camwell | ............... | H01F 13/003 336/173 |
| 2005/0105305 A1* | 5/2005 | Sawada | ............... | H02M 1/4225 363/34 |
| 2006/0131960 A1* | 6/2006 | Aritsuka | ............... | H02J 3/1814 307/17 |
| 2007/0236321 A1* | 10/2007 | Iwai | ..................... | H01F 27/255 336/212 |
| 2008/0310492 A1* | 12/2008 | Kasai | ..................... | H04B 3/04 375/232 |
| 2012/0021618 A1* | 1/2012 | Schultz | ................ | H01R 13/719 439/38 |
| 2019/0057807 A1* | 2/2019 | Hu | .......................... | H01F 27/02 |

* cited by examiner

APPARATUS AND METHOD FOR TRANSFORMING ALTERNATING ELECTRICAL ENERGY

BACKGROUND OF THE INVENTION

The present invention, according to a first aspect, relates to an apparatus for transforming alternating electrical energy, in particular for domestic and industrial applications.

According to a second aspect, the invention relates to an alternating electrical energy transformation process for operation of the apparatus of the invention.

As is known, many domestic appliances and other appliances for domestic and industrial applications are supplied with single-phase AC power, for example from the domestic power distribution network that, in turn, receives it from a power plant through dedicated distribution-transformer substations.

The network voltage and alternating current parameters are obtained and regulated by adjusting, generally by reducing, the power plant voltage by means of large, dedicated, distribution power transformers that, in the final stage, supply an alternating voltage that, for example, in Italy and in the majority of European countries, is 220 VAC, 50 Hz.

It is also known that conventional power transformers, in which a change in the magnetic flux on the primary side generates a corresponding magnetic flux on the secondary side correlated to the primary magnetic flux by the ratio of transformation, are heavy and bulky devices, as well as having non-optimal performance, especially for low to not very high power transformation levels.

SUMMARY OF THE INVENTION

Thus, the aim of the present invention is to eliminate, or at least significantly reduce, the above-mentioned drawbacks of known systems of alternating electrical energy transformation, based on conventional power transformers, by providing a new apparatus and a new alternating electrical energy transformation process that, for the same rated transformer power, enable drastically reducing the size and weight of the transformer or, for the same transformer size and weight, enable transferring much higher power to the secondary of the transformer, i.e. the side for supplying the user appliance, or, alternatively, reducing the power absorbed by the primary of the transformer, i.e. taken from the AC power network, for example from the domestic electricity network, for the same power transferred to the user appliance.

Within the above-mentioned aim, a main object of the present invention is to provide an apparatus for transforming alternating electrical energy, which is structurally extremely simple and functional, and of minimum weight and bulk, so as to be integrated, where necessary, even in the housings of conventional domestic user appliances, or built as an independent transformer unit, easily and quickly interconnectable with the user appliance.

A further object of the present invention is to provide an apparatus of the above indicated type in which the power setting can be scalarly increased to immediately adapt to user appliances, both domestic and industrial, within an extremely wide range of power usage levels.

A further object of the present invention is to provide an apparatus of the above indicated type that can be constructed from easily found, commercially available components.

Yet another object of the present invention is to provide an apparatus of the above indicated type that is extremely safe in operation, is able to meet all regulatory standards of any desired domestic or industrial application and that, at the same time, requires virtually no maintenance.

The last, but not least, object of the present invention is to provide a new method for supplying electricity to electric user appliances that is able to maximize the efficiency of the transformers provided for transferring electrical energy from the supply means to any user appliance, preferably domestic, but also industrial.

According to one aspect of the present invention, the above-mentioned aim and objects, as well as further objects, which will become clearer hereinafter, are achieved by an apparatus and a method for transforming alternating electrical energy according to the appended claims.

BRIEF DESCRIPTION OF THE DRAWINGS

Further distinguishing features and advantages of the apparatus and the method for transforming alternating electrical energy according to the invention will become clearer from the following detailed description of a currently preferred embodiment, shown by way of illustrative but non-limitative example in the accompanying schematic drawings, in which.

DESCRIPTION OF PREFERRED EMBODIMENTS

Figure 1:
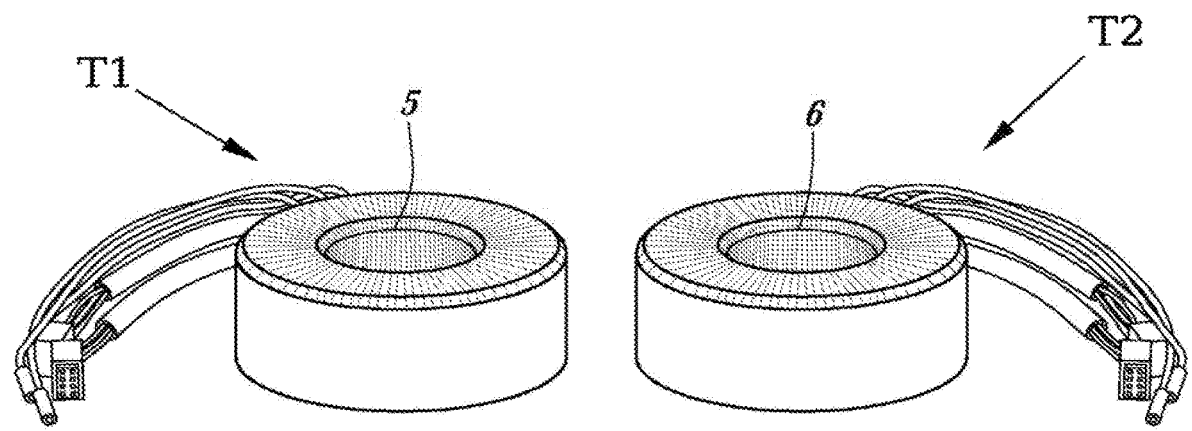
FIG. 1 is a perspective view of the two-stage transformer apparatus according to the present invention, including two toroidal transformer assemblies shown in a non-usable state, i.e. in a condition of being separated from one another.
Figure 2:
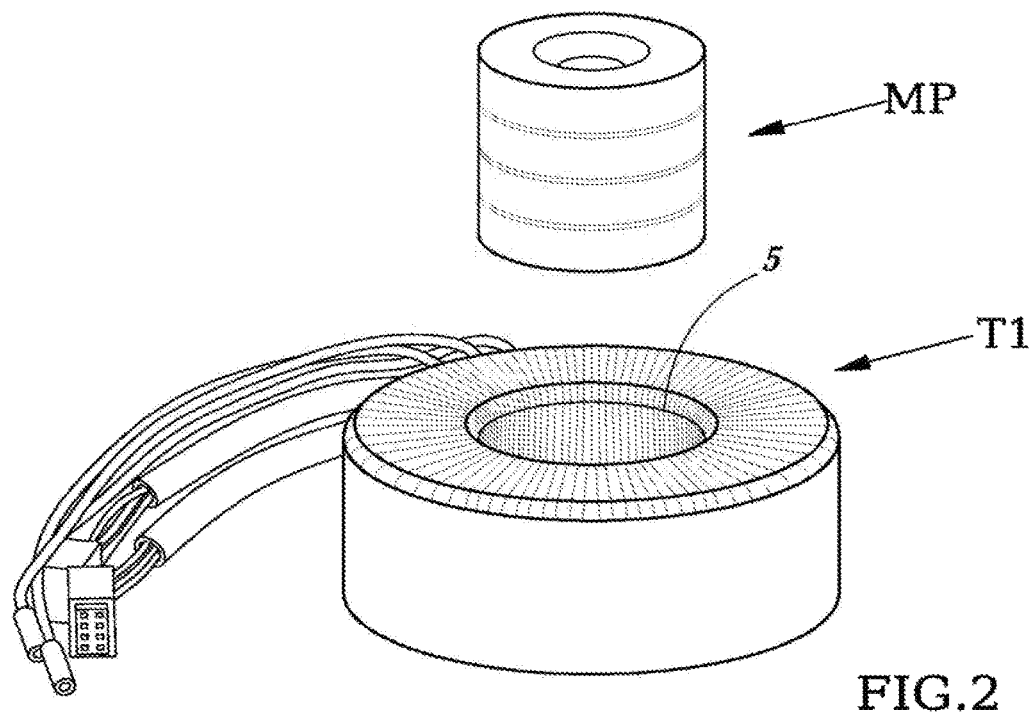
FIG. 2 is a perspective view, on an enlarged scale with respect to FIG. 1, of a single toroidal transformer assembly with at least one permanent magnet, preferably of a neodymium-iron-boron alloy, about to be coupled to the inner surface of the toroidal assembly included in the two-stage transformer of the present invention.
Figure 3:
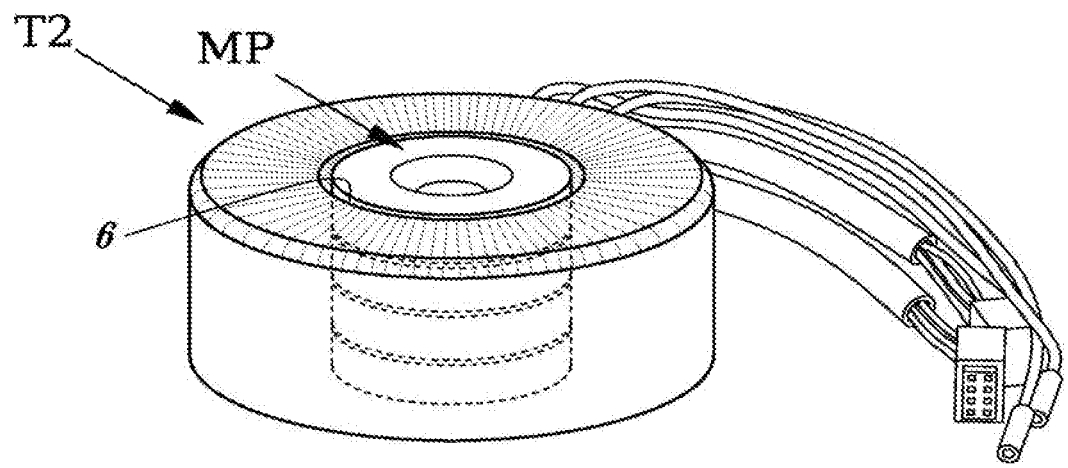
FIG. 3 is a perspective view similar to FIG. 2, showing the toroidal assembly in FIG. 2 of the transformer with the magnet (of a neodymium-iron-boron alloy) inserted inside it.

Making specific reference to the aforesaid figures, the transformation apparatus, according to the present invention, and generally indicated by reference numeral 1, will now be described with reference to a currently preferred embodiment, constituting a new and inventive two-stage apparatus for transforming electrical energy (for example single-phase), in particular for supplying electrical energy to domestic devices, in the case shown, a common desk lamp L.

Nevertheless, a person skilled in the art will understand that, with opportune design studies based on the same inventive concept, the apparatus of the invention can be applied to any type of transformation apparatus of electrical energy, from quite low to even very high power levels.

More specifically, the two-stage apparatus 1 of the invention is based on a double transformation of energy or alternating electric current, to which process one or more permanent magnets MP have been added, according to the present invention, to amplify the electromagnetic field of the toroidal transformer assemblies T1 and T2 constituting the transformation apparatus 1.

According to the invention, in a first step of the method, electrical energy is taken from the network R, and subjected to a first transformation, in particular from 220 volts to 12 volts.

To this end, the first toroidal transformer T1 is used, this being adequately sized according to the electrical energy required by the device to be powered, in this case a simple lamp L.

As mentioned, according to one important aspect of the invention, the apparatus 1 also includes the second toroidal transformer T2, substantially equal to the first toroidal transformer T1, preferably connected in series to the first one, and provided to transform the 12-volt electrical energy or current leaving the first toroidal transformer T1 back to 220 volts AC, i.e. to the voltage of the network R.

Figure 4:
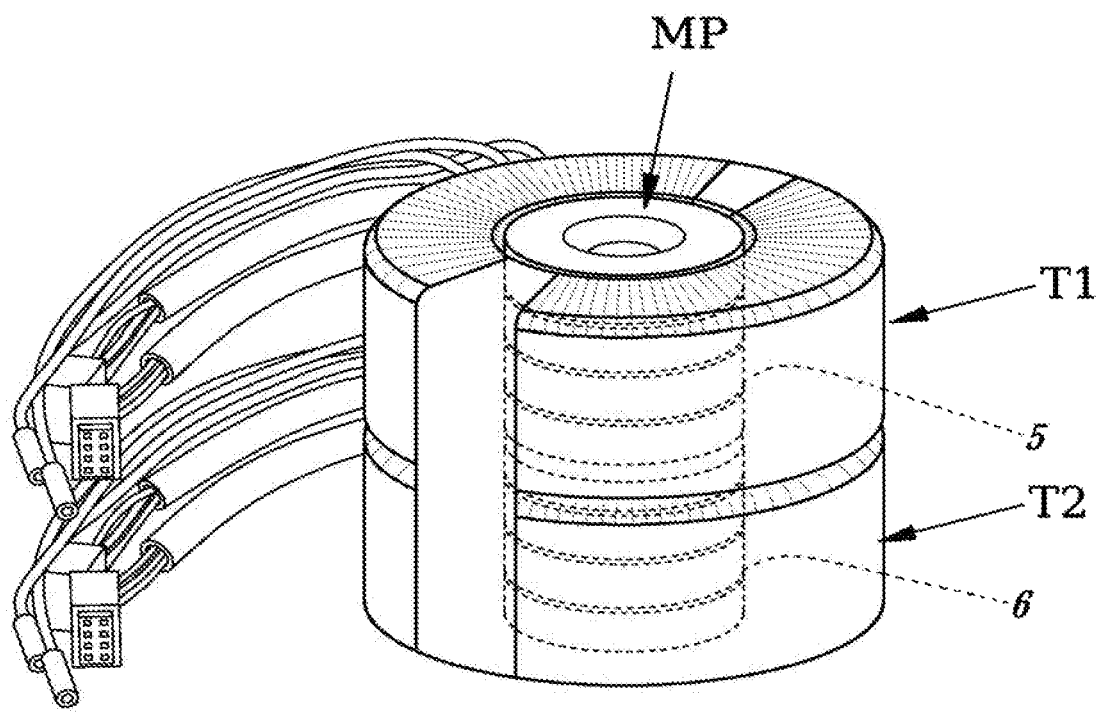
FIG. 4 is a further perspective view showing the two toroidal transformer assemblies in series and constituting the two-stage transformation apparatus of the invention, each containing a respective permanent magnet, coupled in series and one on top of the other in the usable state.

As shown in FIG. 4, for example, the two transformers T1 and T2 are placed one on top of the other and connected in series, so as to intersect their electromagnetic fields.

According to the present invention, a permanent magnet MP is applied and/or inserted in at least one of the toroidal assemblies T1 and T2.

Preferably, as shown in FIG. 4, each toroidal transformer has at least one respective permanent magnet MP inserted therein, this magnet advantageously being of the neodymium type, i.e. composed of a neodymium-iron-boron alloy, which, as is known, is the strongest permanent magnet that is currently commercially available, and which can have any desired shape, for example the annular shape shown in the drawings.

The permanent magnets MP are oriented according to the flux direction of the electromagnetic field generated by each toroidal transformer assembly T1 and T2.

On this point, it should be borne in mind that the size, power, shape and number of magnets MP may vary and must be correctly calibrated according to the final power that it is intended to transfer to the user device, which in the case in question is an ordinary desk lamp L.

It has been unexpectedly found that with the described configuration, the operation was determined by the correct and accurate assembly of the various components of the transformation apparatus 1 of the invention, and that a displacement of even just a few decimillimetres in the assembly phase strongly influenced the "COP", or so-called coefficient of performance, which varied widely.

Figure 5A:
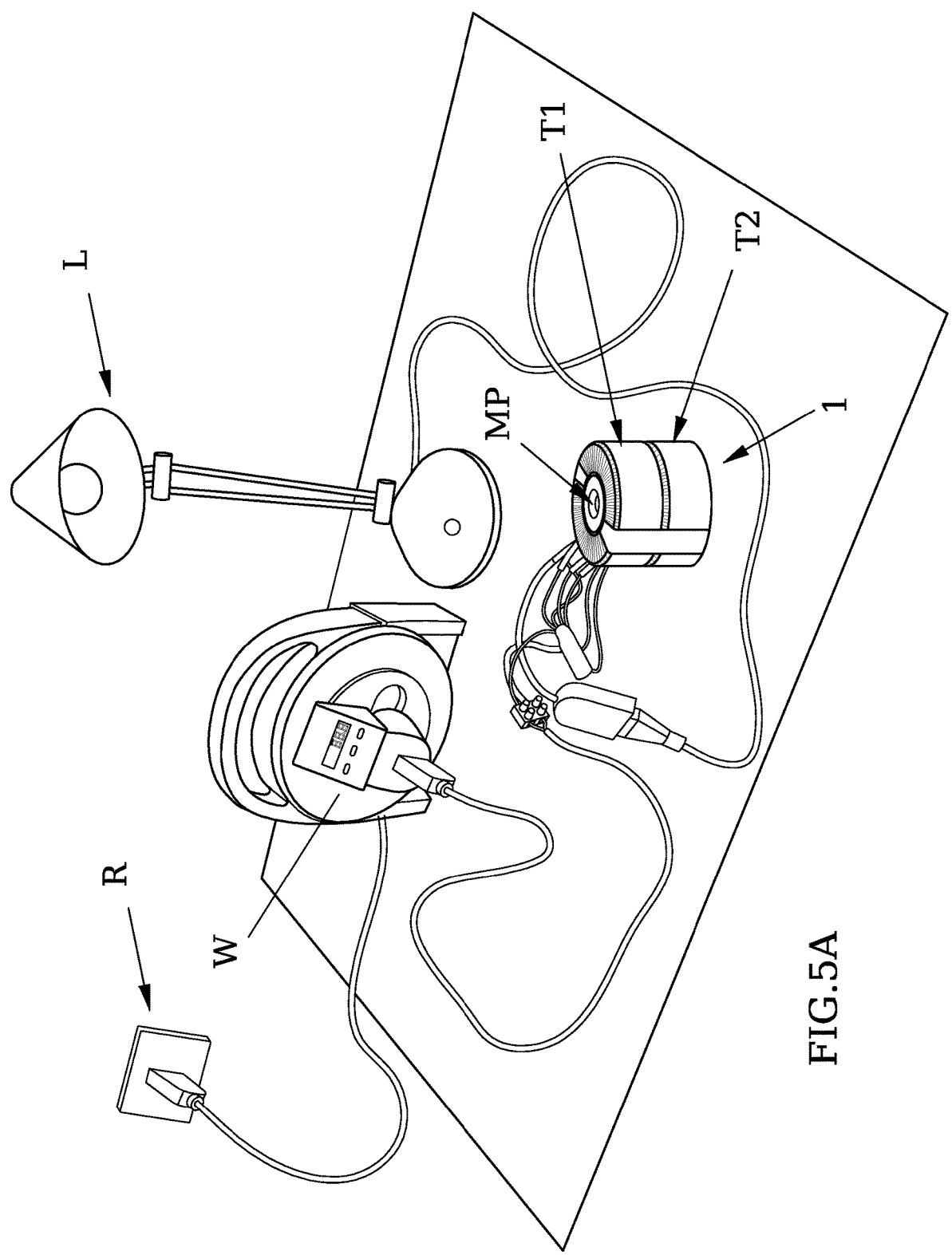
FIGS. 5A to 5C are a further perspective views showing a possible test arrangement for testing the operational performance of the two-stage transformer apparatus according to the present invention.
Figure 5B:
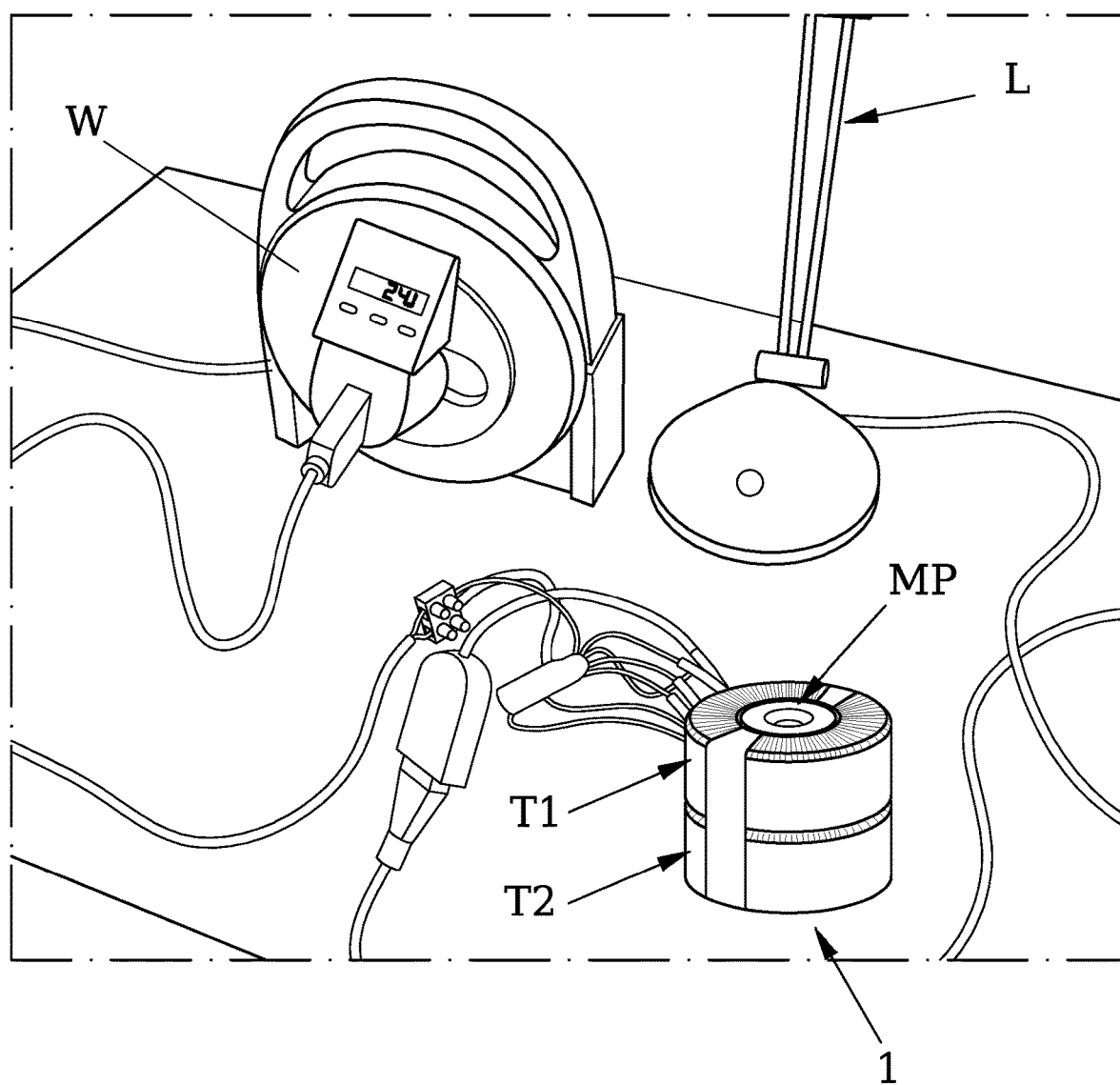
Figure 5C:
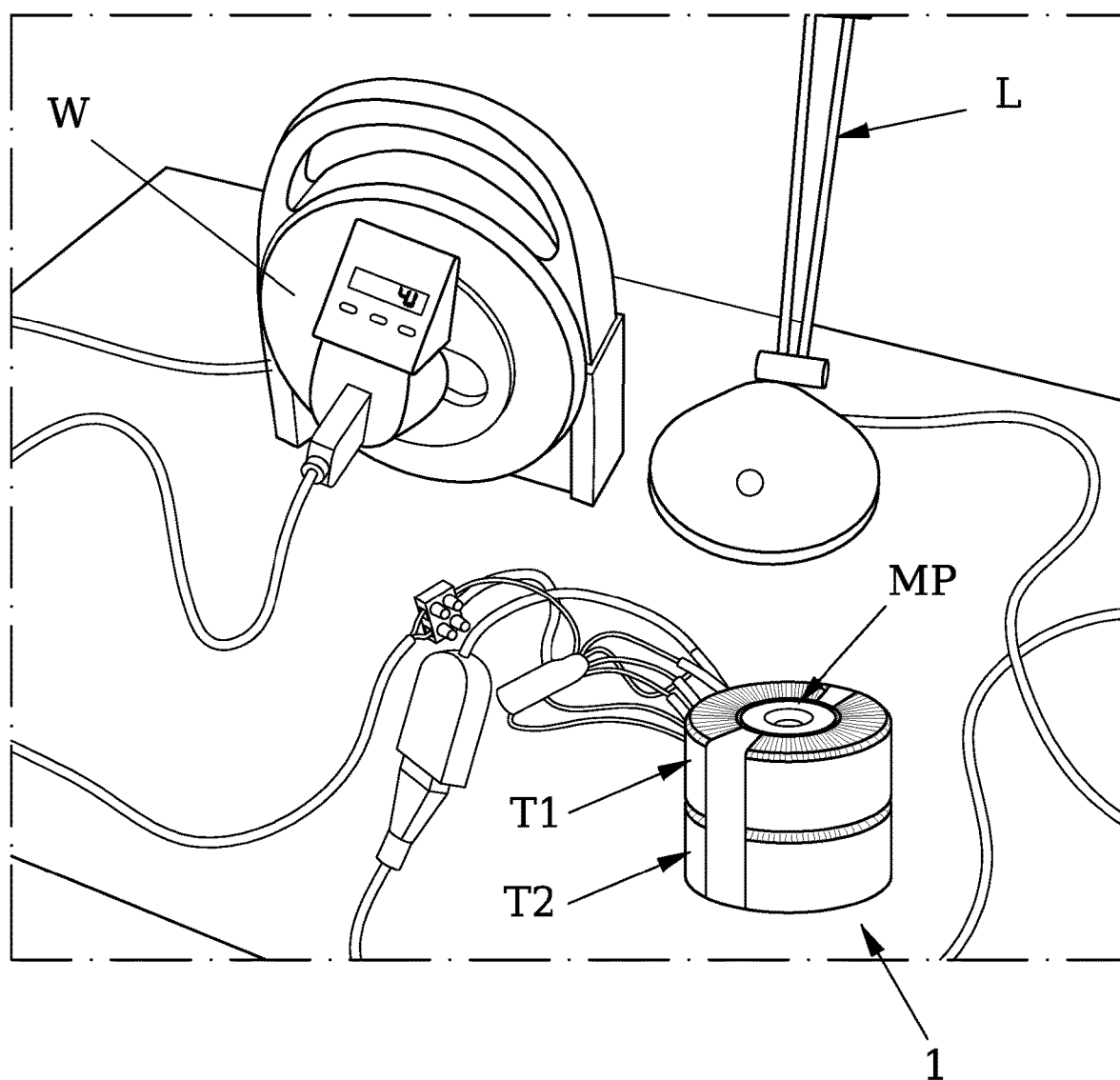

In particular, from the test arrangement shown in FIGS. 5A to 5C, the Applicants have found that in the initial phase the COP was 1, and, in the case of correct sizing of the permanent magnets, the COP was 1, while it was possible to even achieve a COP of substantially 4 or 5 in the case of perfect assembly and calibration.

Furthermore, from the tests carried out by the Applicants, it was determined that it was also possible to obtain a negative COP, or rather corresponding to COP values of 0.5-0.8 in the case of inadequate orientation of the magnets.

In the specific case shown in FIGS. 5A to 5C, a two-stage transformation apparatus was tested for power levels up to 50 VA, calibrated with a common desk incandescent lamp L.

Connected to a power socket of the network R and without the transformer, the lamp indicated a power absorption of approximately 25 W, as indicated by the wattmeter W.

Vice versa, when connected to the output of the transformation apparatus 1, but prior to correct assembly of the apparatus, the lamp had a consumption of 27 W.

During the calibration, an absorption that reached 6 W was observed on the wattmeter W.

The Applicants have also experimented a change in the input voltage, detecting a further saving in terms of efficiency, passing from a consumption of 6 W at 224 VAC (effective voltage of network R) to 4.8 W at the terminals of the lamp L, i.e. on the secondary of the transformation apparatus 1.

Thus, it may be concluded from the foregoing that the aforementioned permanent magnets MP amplify the electromagnetic field of the toroidal transformers T1 and T2.

Although the apparatus and the method of the invention have been described with reference to a currently preferred embodiment thereof, the embodiment described is open to several changes and variants, all falling within the scope of the inventive concept.

For example, by means of opportune calibration of the apparatus of the invention and through the use of opportunely sized and calibrated neodymium permanent magnets, it will be possible to control power levels within a range that the Applicants consider could be extremely wide, i.e. from very low to very high.

Therefore, the invention shall be limited exclusively by the following claims, rather than by the foregoing description.

The invention claimed is:

1. An apparatus for transforming alternating electrical energy supplied by alternating electrical energy supply means to appliances using said alternating electrical energy through electrical transformer means operatively interposed between and electrically coupled to said alternating electrical energy supply means and said appliances using alternating electrical energy, wherein said electrical transformer means are of the two-stage type and comprise a first electrical toroidal transformer assembly having a first central axial through hole, and a second electrical toroidal transformer assembly having a second central axial through hole, said first electrical toroidal transformer assembly and said second electrical toroidal transformer assembly are placed coaxially one on top of the other and connected in series so as to intersect their electromagnetic fields, wherein at least one permanent magnet is inserted in at least one of said first central axial through hole, and said second central axial through hole, and when said alternating electrical energy supply means are switched on, the permanent magnetic field produced by said at least one permanent magnet is added to the alternating electromagnetic field produced by said electrical transformer means, wherein said first toroidal transformer assembly is a step-down toroidal transformer assembly which transform an energy at a first predetermined voltage receivable by said alternating electrical energy supply means, into a second predetermined voltage, and wherein said second toroidal transformer assembly is a step-up toroidal transformer assembly which transform said second predetermined voltage to return it substantially to the value of said first predetermined voltage.

2. An apparatus according to claim 1, wherein each of said first and second toroidal transformer assemblies has at least one respective permanent magnet inserted respectively in said first central axial through hole and said central axial through hole, said permanent magnet being of the neodymium type.

3. An apparatus according to claim 2, wherein said first and second electric toroidal transformer assemblies are substantially the same and mutually placed one on top of the other so as to cause an intersection and strengthening of their electromagnetic fields.

4. An apparatus according to any of claim 2, wherein said electrical energy supply means have a voltage of 220 VAC and wherein said first electric toroidal transformer assembly is connected to said electrical energy supply means so as to transform said voltage from 220 VAC to 12 VAC and wherein said second electric toroidal transformer assembly is connected to said first electric toroidal transformer assembly so as to retransform said voltage from 12 VAC to 220 VAC again.

5. An apparatus according to claim 2, wherein each of said toroidal transformer assemblies has a plurality of respective permanent magnets inserted therein.

6. An apparatus according to claim 2, wherein said at least one permanent magnet has an annular shape.

7. An apparatus according to claim 3, wherein at least one said permanent magnet is positioned inside each electric toroidal transformer assembly.

8. An apparatus according to claim 1, wherein said permanent magnets are permanent magnets made of a neodymium-iron-boron alloy.

9. An apparatus according to claim 8, wherein the power, shape and number of said neodymium-iron-boron alloy permanent magnets are dependent on the power of the appliance using the electrical energy.

10. An apparatus according to claim 1, wherein said first central axial through hole and said second central axial through hole are identical and coaxial.

11. A method for supplying electrical energy to an appliance using electrical energy provided by preferably single-phase electrical energy supply means, wherein said method comprises at least the step of implementing a twofold transformation of the voltage of said electrical energy supply means, said twofold transformation being implemented by electric toroidal transformer means, wherein said electrical transformer means comprise a first electrical toroidal transformer assembly having a first central axial through hole and a second electrical toroidal transformer assembly having a second central axial through hole, which are placed coaxially one on top of the other and connected in series so as to intersect their electromagnetic fields, wherein at least one permanent magnet is inserted in at least one of said first central axial through hole and said second central axial through hole, the permanent magnetic field produced by said at least one permanent magnet is added to the alternating electromagnetic field produced by said electrical transformer means, wherein said first toroidal transformer assembly is a step-down toroidal transformer assembly which transform an energy at a first predetermined voltage receivable by said alternating electrical energy supply means, into a second predetermined voltage, and wherein said second toroidal transformer assembly is a step-up toroidal transformer assembly which transform said second predetermined voltage to return it substantially to the value of said first predetermined voltage.

12. A method according to claim 11, wherein said at least one permanent magnet is a neodymium-iron-boron alloy permanent magnet the power and shape of which are chosen according to the electrical power to be supplied to said user appliance.

* * * * *